United States Patent
Bigler et al.

(10) Patent No.: US 8,740,104 B2
(45) Date of Patent: Jun. 3, 2014

(54) VARIABLE ELECTRIC AUXILIARY HEATER CIRCUIT PUMP

(75) Inventors: Mark Bigler, Gaines, MI (US); Mark Hill, St. Clair, MI (US); Allan Flanagan, Windsor (CA); Joseph Balog, South Lyon, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1563 days.

(21) Appl. No.: 12/164,995

(22) Filed: Jun. 30, 2008

(65) Prior Publication Data

US 2009/0321533 A1 Dec. 31, 2009

(51) Int. Cl.
*B60H 1/04* (2006.01)
*B60H 1/00* (2006.01)
*B60H 1/02* (2006.01)

(52) U.S. Cl.
USPC ...... 237/12.3 B; 237/12; 237/81; 180/65.275; 701/112

(58) Field of Classification Search
CPC .......... B60H 1/00814; B60H 1/00735; B60H 2001/00814; B60H 1/02; B60H 2001/00642; B60H 2001/00307
USPC .................... 237/12.3 B, 12, 81; 180/65.275; 701/112
See application file for complete search history.

(56) References Cited

U.S. PATENT DOCUMENTS

| | | | | |
|---|---|---|---|---|
| 2,594,984 | A * | 4/1952 | Penther et al. | 338/116 |
| 4,462,541 | A * | 7/1984 | Hansen | 237/2 A |
| 4,532,894 | A * | 8/1985 | Wulf et al. | 123/142.5 E |
| 5,366,150 | A * | 11/1994 | Kaimoto et al. | 237/2 A |
| 5,497,941 | A * | 3/1996 | Numazawa et al. | 237/2 A |
| 6,032,869 | A * | 3/2000 | Ito et al. | 237/12.3 B |
| 6,082,626 | A * | 7/2000 | Morikawa et al. | 237/12.3 B |
| 6,269,872 | B1 * | 8/2001 | Anderson | 165/271 |
| 6,309,193 | B1 * | 10/2001 | Repple et al. | 417/423.8 |
| 6,499,963 | B2 * | 12/2002 | Repple et al. | 417/292 |
| 6,598,671 | B1 * | 7/2003 | Zeng et al. | 165/240 |
| 6,607,142 | B1 * | 8/2003 | Boggs et al. | 237/12.3 B |
| 6,782,945 | B1 * | 8/2004 | Eisenhour | 165/203 |
| 6,887,046 | B2 * | 5/2005 | Repple et al. | 417/313 |
| 6,889,762 | B2 * | 5/2005 | Zeigler et al. | 165/240 |
| 6,955,141 | B2 * | 10/2005 | Santanam et al. | 123/41.08 |
| 7,007,856 | B2 | 3/2006 | La Falce et al. | |
| 7,237,513 | B2 * | 7/2007 | Pfeffinger et al. | 123/41.29 |
| 7,735,744 | B2 * | 6/2010 | Eisenhour | 237/12.3 B |

(Continued)

FOREIGN PATENT DOCUMENTS

| | | | | |
|---|---|---|---|---|
| EP | 965737 A2 * | 12/1999 | | F01P 7/16 |
| FR | 2944235 A1 * | 10/2010 | | B60K 11/02 |

(Continued)

OTHER PUBLICATIONS

Tanaka, JP 59008515 A English translation, Jan. 17, 1984.*

*Primary Examiner* — Kang Hu
*Assistant Examiner* — Phillip E Decker
(74) *Attorney, Agent, or Firm* — Ralph E Smith

(57) ABSTRACT

A heating and ventilation system for a passenger compartment of a vehicle. The system having a heater core supplied with engine cooling fluid via a variable flow pump for heating an air flow supplied to the passenger compartment. The system additionally having a controller for controlling the pump to increase engine cooling fluid mass flow-rate in response to a detected temperature decrease of the engine cooling fluid when the engine is off.

8 Claims, 4 Drawing Sheets

(56) References Cited

U.S. PATENT DOCUMENTS

| | | | |
|---|---|---|---|
| 2001/0026761 A1* | 10/2001 | Repple et al. | 417/292 |
| 2002/0152972 A1* | 10/2002 | Iwasaki et al. | 123/41.44 |
| 2003/0031905 A1* | 2/2003 | Saito et al. | 429/26 |
| 2003/0143084 A1* | 7/2003 | Repple et al. | 417/292 |
| 2003/0165725 A1* | 9/2003 | Kudou et al. | 429/26 |
| 2005/0130005 A1* | 6/2005 | Saito et al. | 429/26 |
| 2005/0274814 A1* | 12/2005 | Schwartz et al. | 237/28 |
| 2006/0157576 A1* | 7/2006 | Eisenhour | 237/28 |
| 2006/0180300 A1* | 8/2006 | Lenehan et al. | 165/247 |
| 2007/0137592 A1* | 6/2007 | Hanai | 123/41.14 |
| 2008/0185925 A1* | 8/2008 | Kurple | 310/54 |
| 2009/0229649 A1* | 9/2009 | Yang et al. | 136/201 |
| 2009/0283604 A1* | 11/2009 | Martinchick et al. | 237/12.3 B |
| 2011/0214627 A1* | 9/2011 | Nishikawa et al. | 123/41.02 |
| 2011/0290895 A1* | 12/2011 | Yin | 237/12 |

FOREIGN PATENT DOCUMENTS

| | | | | |
|---|---|---|---|---|
| JP | 59008515 A | * | 1/1984 | B60H 1/08 |
| JP | 59145617 A | * | 8/1984 | B60H 3/00 |
| JP | 61046712 A | * | 3/1986 | B60H 1/08 |
| JP | 2008267180 A | * | 11/2008 | F01P 7/16 |
| WO | WO 2011/077020 A1 | * | 6/2011 | F01P 7/16 |

* cited by examiner

ＵＳ 8,740,104 B2

VARIABLE ELECTRIC AUXILIARY HEATER CIRCUIT PUMP

FIELD OF THE INVENTION

The present invention relates to a heating and ventilation system for a vehicle, and more particularly, to heating a flow of air to a passenger compartment of the vehicle.

BACKGROUND OF THE INVENTION

Modern motor vehicles are typically equipped with heating and ventilation systems for supplying airflow to the vehicle's cabin, i.e. passenger compartment. Heating and ventilation system airflow may be supplied either from ambient or re-circulated air, and may be additionally cooled or heated by the system prior to reaching the passenger compartment.

In most vehicles, engine coolant, usually a mixture of water and anti-freeze, is circulated between an operating internal combustion engine and a radiator, in order to remove excess heat. Some of the hot coolant may be diverted to the heating and ventilation system's heater core, i.e. a radiator-like heat exchanger, to supply heat to the vehicle cabin. The hot coolant is typically supplied to the heater core by an engine-driven pump. The coolant is usually returned to the engine's cooling circuit following the coolant being channeled through the heater core to give off heat. In such systems, the heating and ventilation system typically uses a fan to force air through fins on the heater core and then directs heated air through air vents into the cabin.

There may be situations where there is a need to extend delivery of heat to the cabin even after the engine has been turned off. When the engine is turned off an engine-driven pump also becomes inactive and thus can no longer circulate coolant to the heater core. Without hot engine coolant being circulated cabin airflow returns to ambient temperature fairly rapidly.

Electrically driven auxiliary fluid pumps have been utilized in an effort to prolong delivery of heated air and maintain comfortable vehicle cabin environment after engine shutdown. However, as the vehicle's engine ceases to operate, the temperature of engine coolant begins to drop, thereby steadily losing its effectiveness in heating the cabin airflow. Hence, a heating and ventilation system capable of prolonging delivery of heated air to the vehicle passenger compartment when the vehicle's engine has been turned off would be quite desirable.

SUMMARY OF THE INVENTION

The present invention provides an arrangement for a heating and ventilation system for a passenger compartment of a vehicle. According to the invention, the heating and ventilation system has a heater core fluidly connected to a cooling system of an engine in the vehicle. The heater core is arranged relative to an air flow to heat air supplied to the passenger compartment. The heating and ventilation system includes a variable flow pump for supplying engine cooling system fluid to the heater core. The system additionally includes a controller for controlling the pump to increase engine cooling fluid mass flow-rate in response to a detected temperature decrease of the engine cooling fluid when the engine is off.

In accordance with another aspect of the present invention a method is provided for heating a passenger compartment of a vehicle. The method includes delivering engine cooling system fluid via a variable flow pump to the heater core, wherein the heater core is arranged relative to an air flow for heating air supplied to the passenger compartment. Furthermore, the method includes detecting when an engine of the vehicle is off, and detecting a temperature decrease of the engine cooling fluid. Additionally, the method includes increasing a mass flow-rate of the engine cooling system fluid flowing to the heater core in response to the detected temperature decrease of the fluid when the engine is off.

The present invention is suitable for use in a hybrid electric motor vehicle.

The detailed description and specific examples which follow, while indicating preferred embodiments of the invention, are intended for purposes of illustration only and are not intended to limit the scope of the invention.

DETAILED DESCRIPTION

Figure 1:
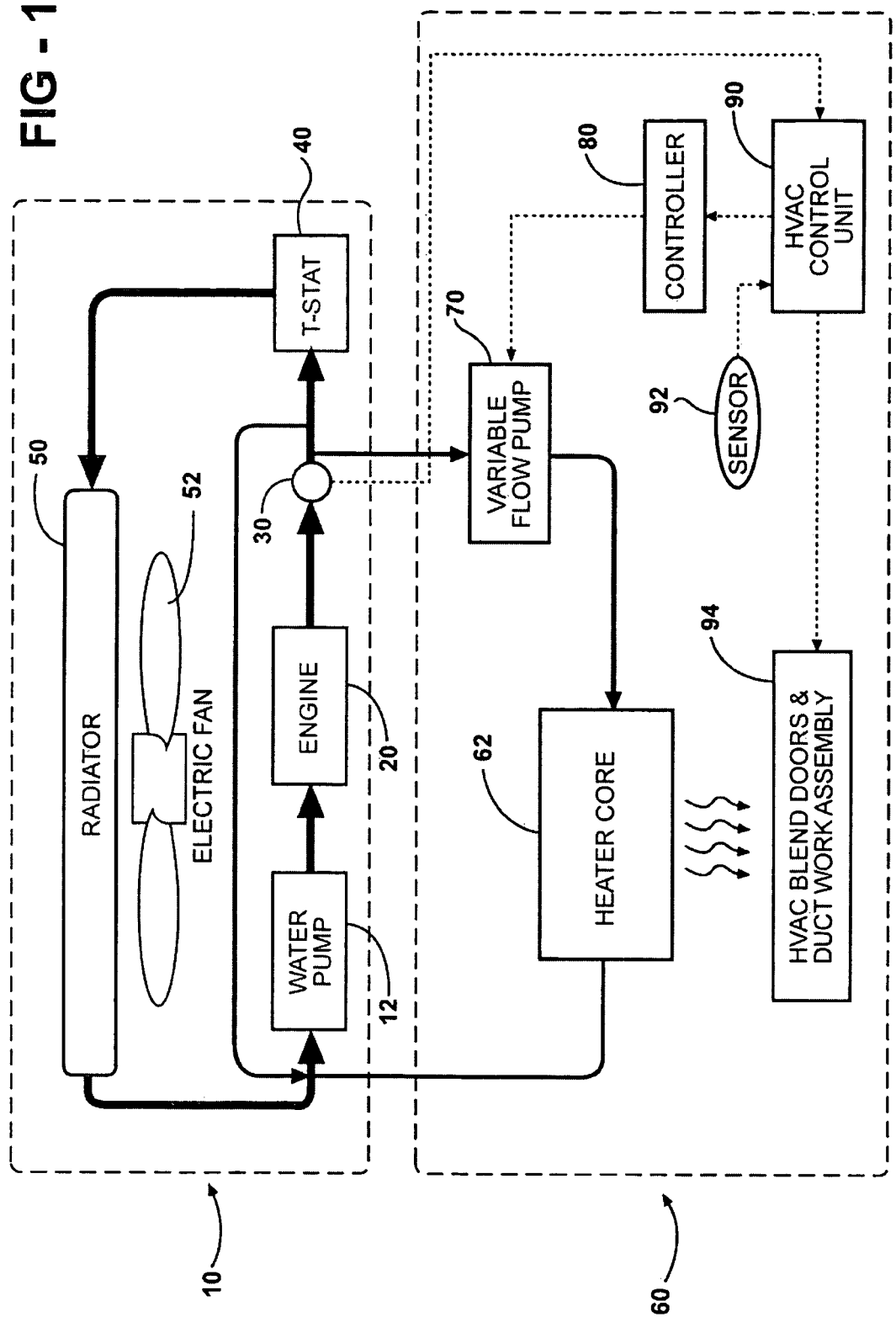
FIG. 1 is a schematic diagram of a heating and ventilation system for a motor vehicle's passenger compartment according to the invention.

Referring to the drawings in which like elements of the invention are identified with identical reference numerals throughout. FIG. 1 generally illustrates a schematic of a heating and ventilation (HVAC) system for a motor vehicle's passenger compartment, i.e. cabin. The HVAC system according to the invention may provide heated airflow to a vehicle's cabin after an engine of the vehicle is shut down.

An internal combustion engine typically generates large amounts of heat while producing power for propelling a vehicle, and thus typically includes a system for cooling the engine. As shown in FIG. 1, engine cooling system 10 includes water pump 12. Water pump 12 is fluidly connected to engine 20 for circulating a coolant through critical regions of the engine. Water pump 12 may be driven mechanically by the engine, or electrically by an electrical system of the vehicle, to function while the engine is on. After the coolant is pumped through engine 20, the coolant is routed to an engine coolant temperature (ECT) sensor 30. ECT sensor 30 measures temperature of the coolant. Sensor 30 communicates an electrical signal to vehicle-mounted HVAC control unit 90.

The coolant is routed to thermostat 40 after making contact with ECT sensor 30. Thermostat 40 is controlled to open and rout the coolant to radiator 50, i.e. a fluid-to-air heat exchanger, for lowering the temperature of the coolant, if the ECT reaches a certain predetermined value. The ECT value at which thermostat 40 is programmed or set to open is typically determined through experimental optimization of engine operation, and may also reflect desired engine component durability. Fan 52 is typically utilized to force outside ambient air through radiator 50 for reducing temperature of coolant passing through the radiator. Following the ECT being reduced by radiator 50, the coolant is routed back to pump 12. If the ECT is below the value at which thermostat 40 may open, i.e. the coolant temperature is low enough to accept additional engine-generated heat, the coolant is routed back to pump 12.

Vehicle HVAC system 60 is fluidly connected to engine cooling system 10 for heating the vehicle cabin. Variable flow pump 70 is fluidly connected to the engine coolant between ECT sensor 30 and thermostat 40. Variable flow pump 70 may be activated to deliver a predetermined constant flow-rate of coolant to heater core 62 or remain inactive while the engine is on. Additionally, according to the invention, variable flow pump 70 is capable of supplying not only a steady flow of fluid or being shut off entirely, but also of supplying fluid to the heater core at various flow rates. The variable flow pump may be an auxiliary pump, and is driven by the vehicle's electrical system to enable the pump to function independently of the engine.

Variable flow pump 70 may remain inactive if a predetermined minimum coolant flow is being pushed through to the heater core by pump 12. In an exemplary embodiment, the minimum coolant flow-rate to the heater core is set at 2 gallons/minute, in order to assure sufficient amount of heat to the cabin. As coolant passes through heater core 62, the heater core radiates heat absorbed from the engine coolant to increase temperature of air flow delivered to the vehicle cabin (not shown). Typically, cabin airflow is delivered to the passenger compartment via HVAC blend doors and air duct assembly 94 connected to air outlets (not shown) positioned throughout the cabin. The coolant is routed back to engine cooling system 10 for re-entry into pump 12, after the coolant has passed through the heater core.

Variable flow pump 70 is controlled by controller 80 to increase coolant flow-rate to heater core 62 in response to a detected decrease of the ECT. Depending on the demand for heat in the cabin, variable flow pump 70 is controlled to increase coolant flow-rate up to the minimum coolant flow-rate value when the engine is operating at a low speed, such as idle. Variable flow pump 70 is additionally controlled to generate entire coolant flow to the heater core when the engine is off. When the engine is off, variable flow pump 70 may increase coolant flow-rate according to an algorithm in proportion to the detected decrease of ECT, and in relation to ambient temperature of the vehicle cabin. Cabin ambient temperature may be controlled by a request from HVAC control unit 90 with an operator interface (not shown) positioned in the cabin. Typically, cabin ambient temperature is measured and communicated to the HVAC control unit by sensor 92. Sensor 92 may be infrared type, or any other suitable alternative.

Figure 2:
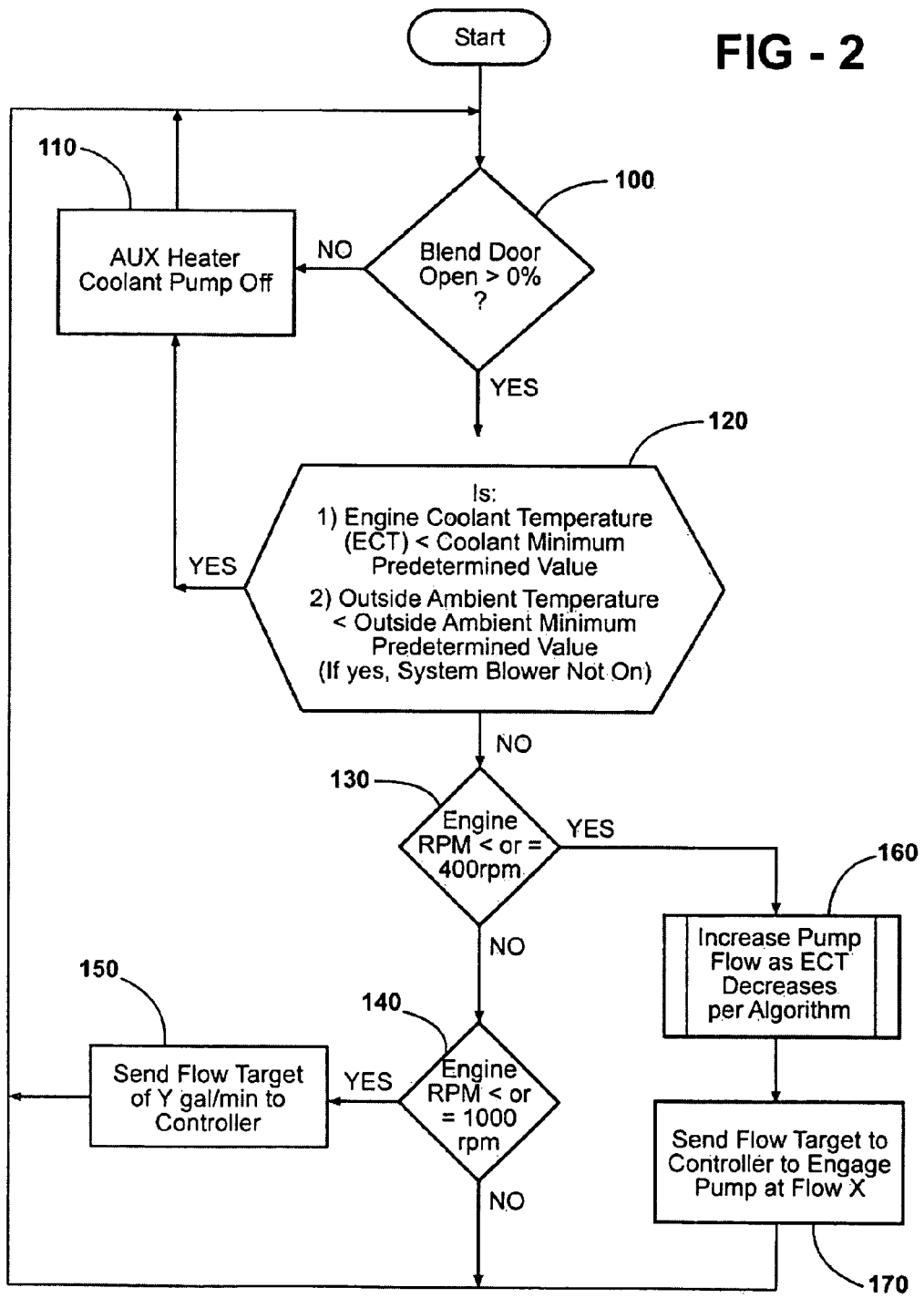
FIG. 2 is a flow diagram illustrating a method for heating a passenger compartment of a vehicle according to the invention.

FIG. 2 illustrates the method of the present invention by which heated airflow can be supplied to a vehicle's cabin after an engine of the vehicle is shut down. With the vehicle's electrical system activated, the method is enabled in block 100. In block 100 the controller determines whether a blend door, i.e. a flap arranged in the heating and ventilation system for controlling amount of heated air to be merged with ambient airflow, is not shut. The determination of whether the blend door is not shut is made based on the controller receiving a signal from a blend door sensor which signifies that the blend door's opening is greater than zero percent. If the blend door's opening is not greater than zero percent the method advances to block 110, where the variable flow pump is deactivated (if active). Following block 110 the method proceeds back to block 100, where it is again enabled. If the blend door's opening is greater than zero percent, i.e. the door is determined to be open to some degree, the method advances to block 120.

In block 120 the controller determines whether the engine coolant temperature is below a predetermined minimum coolant temperature, and whether the outside ambient temperature is below a predetermined minimum ambient temperature. If the engine coolant temperature and the outside ambient temperature are below their predetermined minimum values, an air blower motor arranged to supply airflow to the cabin is not turned on so as to prevent cold air from being forced into the cabin. In such a case the method advances to block 110, and then proceeds back to block 100. If the engine coolant temperature and the outside ambient temperature are not below their predetermined minimum values, the method advances to block 130. In block 130 the controller determines whether the engine speed is equal to or below a first predetermined value. In the exemplary embodiment, the first predetermined value is denoted as 400 revolutions per minute (RPM). If the engine speed is not equal to or is below 400 RPM, the method advances to block 140.

In block 140 the controller determines whether the engine speed is equal to or below a higher second predetermined value. In the exemplary embodiment, the higher second predetermined value is denoted as 1000 RPM. If the engine speed is equal to is or below 1000 RPM, the method advances to block 150 and the controller sends an experimentally predetermined constant flow target to the variable flow pump, following which the method proceeds back to block 100. The predetermined constant flow target is generally set at a level that may provide sufficient fluid flow for adequately heating cabin air from an engine operating at or near idle speed. If in block 140 it is determined that the engine speed is greater than 1000 RPM, the variable flow pump is directed to provide no fluid flow, and the method proceeds back to block 100. If it is determined in block 130 that the engine speed is equal to or below 400 RPM, the method advances to block 160. Because engine idle is typically set between the first predetermined value and the higher second predetermined value, a determination that the engine speed is equal to or below 400 RPM is used to signify to the controller that the engine is off. It will be appreciated that other arrangements could be substituted to detect that the engine is off.

In block 160 the controller accesses an algorithm (such as via a look up table) for computing the pump's flow rate. The algorithm computes an increased pump mass flow-rate in relation, i.e. proportionally, to the temperature drop of the engine coolant. After the pump mass-flow rate has been computed, the method advances to block 170 where the controller directs the pump to deliver the computed mass flow-rate. Following block 170 the method proceeds back to block 100, where the method is again enabled.

As noted above, in the exemplary embodiment, the constant flow target enabled in block 150 is set at 2 gallons/minute. The controller is programmed to compute adjusted pump flow differently based on a position of the blend door. If the blend door is in a position where it is blending 80% or less of heated air and 20% or more of cold air, the algorithm can be arranged to determine an adjustment to coolant flow-rate of the variable flow pump 70 by adding a Flow Offset to a constant pump flow value. The Flow Offset (shown in FIGS. 3 and 4) is an adjustment to a coolant flow-rate of the variable flow pump 70, i.e. fluid flow in addition to current level of pump flow. Current level of pump flow may be set as a constant flow target value, which could be experimentally predetermined during vehicle development to supply appropriately heated cabin air.

A change in cabin temperature (Cabin Delta Temperature) can be determined by subtracting a temperature value requested by the HVAC control unit 90 from an actual cabin temperature measured by sensor 92, i.e. Cabin Delta Temperature=HVAC System Control Set Temperature−Interior Temperature. The Interior Temperature value used in the equation may be an average of values measured in more than one location inside the cabin. The determined Cabin Delta Temperature can be ascertained from a Flow Offset Table (shown in FIG. 3) for correlation with a predetermined Flow Offset. Relationship of predetermined Flow Offset versus Cabin Delta Temperature is shown graphically in FIG. 4. Adjusted Pump Flow value (ECPA) is then determined as ECPA=Flow Offset+Constant Flow Target, i.e. Flow Offset plus the predetermined constant flow target.

Figure 3:
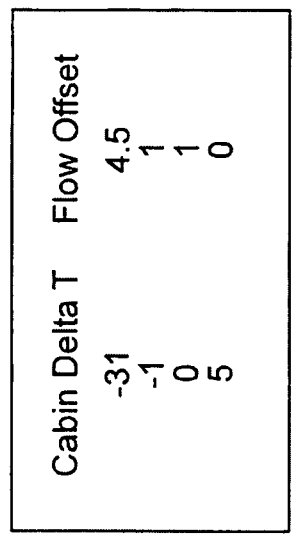
FIG. 3 is a Flow Offset Table according to an embodiment of the invention.
Figure 4:
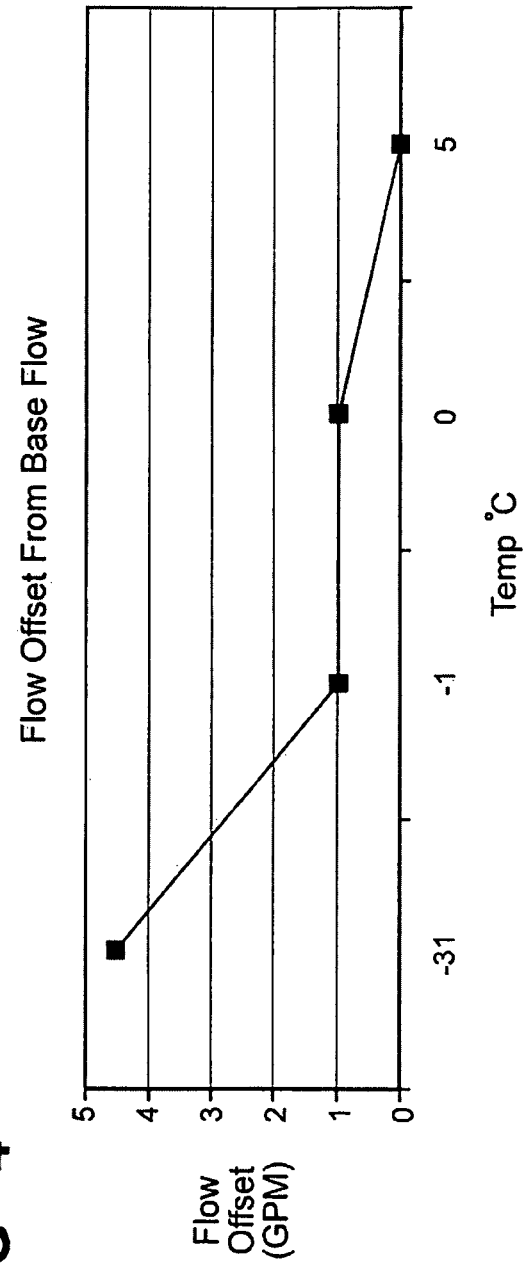
FIG. 4 is a graphical representation of the Flow Offset Table shown in FIG. 3.

For example, if HVAC System Control Set Temperature is 22 degrees C., and the Interior Temperature is 15.5 degrees C., then the Cabin Delta Temperature is 6.5 degrees C. FIG. 3 shows a Flow Offset Table where Flow Offset of 0 gallons/minute is found to correlate with 6.5 degrees C. Cabin Delta Temperature. If a predetermined constant flow target is set at 2 gallons/minute, the Adjusted Pump Flow value (ECPA) is equal to 2 gallons/minute.

If the blend door is in a position where it is blending 80% or more of heated air and 20% or less of cold air, the algorithm can determine an adjustment to a coolant flow-rate of the variable flow pump 70 by further incrementing the Adjusted Pump Flow value (ECPA) from ECPA1 to ECPA2. As above, Adjusted Pump Flow value is determined as ECPA=Flow Offset+Constant Flow Target, but the ECPA value is now recorded as ECPA1. Additionally, engine coolant temperature value (ECT) is recorded as initial engine coolant temperature value (ECTA).

A change in engine coolant temperature (ECTDELTA) is determined as ECTDELTA=(ECTA−ECT), i.e. initial engine coolant temperature value minus current engine coolant temperature value. ECTDELTA can be zero, a positive, or a negative value. Typically, when the engine is off, ECTDELTA will be either a positive value or zero, because without additional heat input from the engine, temperature of the engine coolant will decrease with time. Subsequently, newly Adjusted Coolant Flow is determined as ECPA2=ECPA1+ (ECTGAIN×ECTDELTA), i.e. the product of gain value and change in engine coolant temperature is added to the Adjusted Pump Flow value. In the algorithm, gain value (ECTGAIN) is an experimentally predetermined correction factor. In the exemplary embodiment ECTGAIN is set at 0.5 to achieve a preferred rate of change in the pump flow-rate. Generally, the algorithm reflects an experimentally determined relationship between numerous factors such as, for example, variation in outside ambient and cabin temperature, vehicle cabin dimensional parameters, specific blend door positioning, and capability of the variable flow pump.

For example, Adjusted Pump Flow value (ECPA1) is 2 gallons/minute and ECTGAIN is set at 0.5. If initial engine coolant temperature value (ECTA) is equal to 88 degrees C., and current engine coolant temperature value (ECT) is equal to 82.1 degrees C., then change in engine coolant temperature (ECDELTA) is equal to 5.9 degrees C. Hence, the newly Adjusted Coolant Flow (ECPA2) for variable flow pump 70 is equal to 2+(5.9×0.5), or 4.95 gallons/minute.

Figure 5:
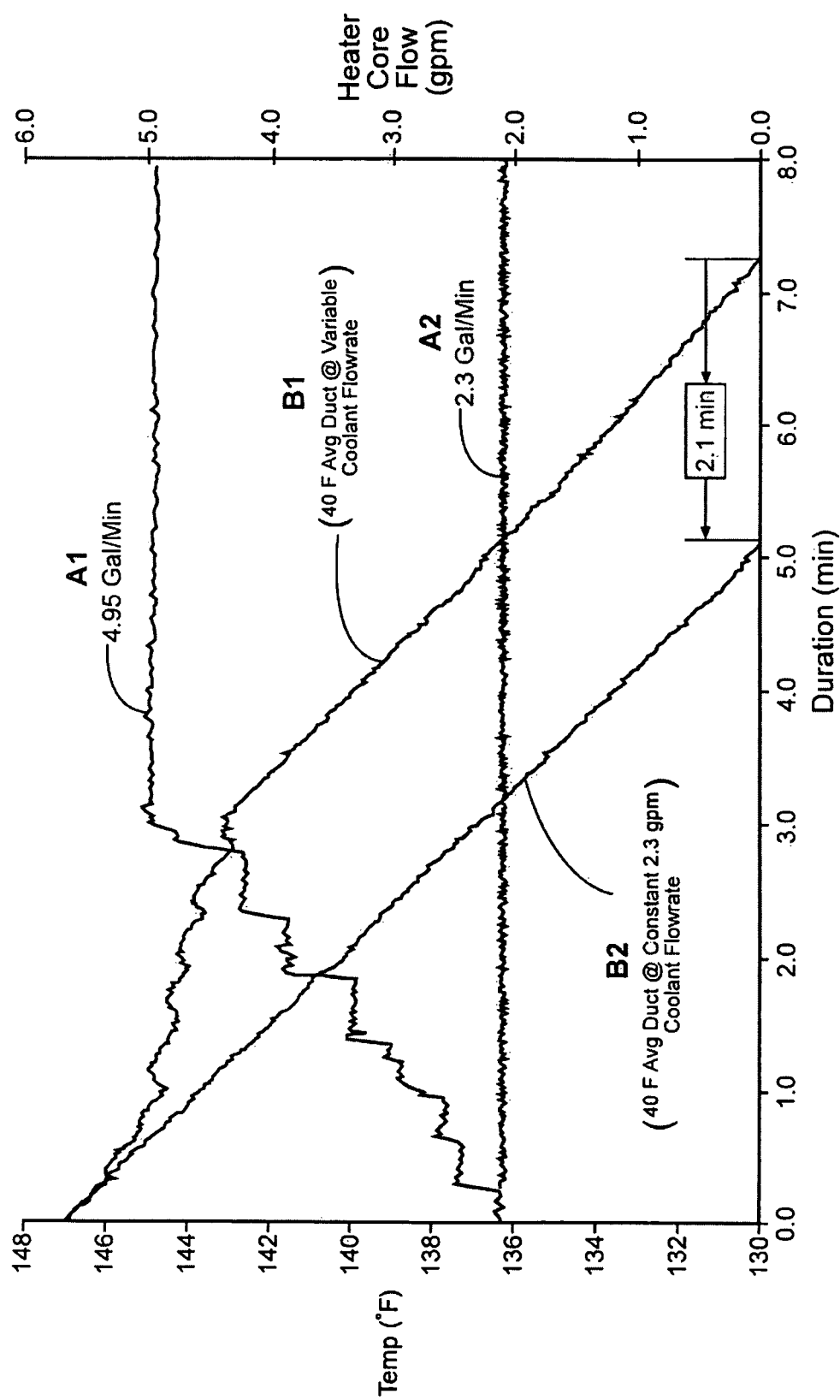
FIG. 5 is a graph illustrating a comparison of performance between the present invention and prior art.

FIG. 5 shows the present invention in operation in comparison with a conventional HVAC arrangement after a vehicle's engine is shut off. The graph illustrates average ventilation duct temperature, remaining above 54 degrees C. (130 degrees F.) 2.1 minutes longer with the coolant flow-rate being adjusted from 2 gallons/minute to 4.95 gallons/minute, than with a typical constant coolant flow-rate according to the conventional arrangement. Coolant flow-rate A1 is shown as being adjusted from 2.3 to 4.95 gallons/minute, and generating average ventilation duct temperature B1 which remains above 54 degrees C. for 7.2 minutes. In comparison, coolant flow-rate A2 is shown as being held constant at 2.3 gallons/minute, and generating average ventilation duct temperature B2 which remains above 54 degrees C. for 5.1 minutes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A heating and ventilation system for a passenger compartment of a vehicle comprising:
    a heater core fluidly connected to a cooling system of an engine in the vehicle, the heater core arranged relative to an air flow to heat air supplied to the passenger compartment;
    a variable flow pump for supplying engine cooling system fluid to the heater core; and
    a controller configured to detect if the engine is off and to control the pump to proportionally increase engine cooling fluid flow rate according to an algorithm in response to a detected temperature decrease of the engine cooling fluid when the engine is off.

2. A heating and ventilation system of claim 1 further comprising the controller controlling the pump to increase engine cooling fluid flow rate up to a predetermined minimum when the engine is operating at idle.

3. A heating and ventilation system of claim 1 wherein the cooling system is for an internal combustion engine that is part of an internal combustion engine and electric motor combination in a hybrid vehicle.

4. A heating and ventilation system of claim 3 wherein the engine is kept off until the air supplied to the passenger compartment cannot be heated up to a predetermined temperature.

5. A method for heating a passenger compartment of a vehicle, comprising:
    delivering engine cooling system fluid to a heater core, the heater core being arranged to heat air supplied to the passenger compartment;
    detecting when an engine of the vehicle is off;
    detecting a temperature decrease of the engine cooling fluid; and
    proportionally increasing a flow-rate of the engine cooling system fluid flowing to the heater core according to an algorithm in response to the detected temperature decrease of the fluid when the engine is off.

6. A method of claim 5 further comprising increasing the flow-rate of the engine cooling system fluid flowing to the heater core up to a predetermined minimum when the engine is operating at idle.

7. A method of claim 5 wherein detecting when an engine of the vehicle is off is for an internal combustion engine that is part of an internal combustion engine and electric motor combination in a hybrid vehicle.

8. A method of claim 7 further comprising keeping the engine off until the air supplied to the passenger compartment cannot be heated up to a predetermined temperature.

* * * * *